(12) United States Patent
Ali et al.

(10) Patent No.: US 6,289,421 B1
(45) Date of Patent: Sep. 11, 2001

(54) INTELLIGENT MEMORY DEVICES FOR TRANSFERRING DATA BETWEEN ELECTRONIC DEVICES

(75) Inventors: Syed S. Ali; Mohd Majed Hobbi, both of Allentown; Steven C. Szep, Orefield, all of PA (US)

(73) Assignee: Lucent Technologies, Inc., Murray Hill, NJ (US)

( * ) Notice: Subject to any disclaimer, the term of this patent is extended or adjusted under 35 U.S.C. 154(b) by 0 days.

(21) Appl. No.: 09/316,215

(22) Filed: May 21, 1999

(51) Int. Cl.[7] .................................................. G06F 12/00
(52) U.S. Cl. ............................. 711/149; 711/168; 710/57
(58) Field of Search .............................. 710/57; 711/149, 711/131, 168; 345/518

(56) References Cited

U.S. PATENT DOCUMENTS

| | | | |
|---|---|---|---|
| 5,473,756 | * 12/1995 | Traylor | 710/57 |
| 5,497,373 | * 3/1996 | Hulen et al. | 370/259 |
| 5,802,351 | * 9/1998 | Frampton | 395/500.48 |

* cited by examiner

Primary Examiner—Reginald G. Bragdon
(74) Attorney, Agent, or Firm—John E. Curtin, Esq.; Troutman, Sanders, Mays & Valentine (57) ABSTRACT

Intelligent memory devices allow for the transfer of data between two or more electronic devices, such as digital signal processors and microcontrollers. The memory devices may be designed as dual port memory devices capable of sending/receiving synchronous, serial data. The use of serial data reduces the pin count of the memory devices and those connected to it. The memory devices also utilize a dedicated pair of data bits and memory pointers to carry out management of the memory and data transfers allowing connected devices to reduce the amount of processing time spent on such matters.

60 Claims, 4 Drawing Sheets

| PIN → | 8 or 9 | 14 or 15 | 16 or 17 | 18 or 19 | 12 or 13 | Comment |
|---|---|---|---|---|---|---|
| | 0 | 0 | 0(1) | 0(1) | 8 bit data write | data (0) |
| | 0 | 0 | 0(1) | 1(1) | 8 bit data write | command data (1) |
| | 0 | 0 | 1(1) | 0(1) | 8 bit data write | Acknowledge (2) |
| | 0 | 0 | 1(1) | 1(1) | 8 bit data write | Device status (3) |
| | 0 | 1 | 0(2) | 0(2) | 8 bit data read | data (0) |
| | 0 | 1 | 0(2) | 1(2) | 8 bit data read | command data (1) |
| | 0 | 1 | 1(2) | 0(2) | 8 bit data read | Acknowledge (2) |
| | 0 | 1 | 1(2) | 1(2) | 8 bit data read | Device status (3) |
| | 1 | 0 | 0(2) | 0(2) | X | WRITE 1 → 21 bytes present |
| | 1 | 0 | 0(2) | 1(2) | X | WRITE 22 → 43 bytes present |
| | 1 | 0 | 1(2) | 0(2) | X | WRITE 44 → 63 bytes present |
| | 1 | 0 | 1(2) | 1(2) | X | WRITE Mailbox full (64 bytes) |
| | 1 | 1 | 0(2) | 0(2) | X | READ Mailbox empty |
| | 1 | 1 | 0(2) | 1(2) | X | READ 1 → 21 bytes present |
| | 1 | 1 | 1(2) | 0(2) | X | READ 22 → 43 bytes present |
| | 1 | 1 | 1(2) | 1(2) | X | READ 44 → 64 bytes present |

NOTES:
- "(1)" indicates pin is an input
- "(2)" indicates pin is an output
- Pins 10 and 11 are used as CLOCKS

*FIG. 4*

INTELLIGENT MEMORY DEVICES FOR TRANSFERRING DATA BETWEEN ELECTRONIC DEVICES

BACKGROUND OF THE INVENTION

Data passing between a digital signal processor ("DSP") and a microcontroller typically requires a significant amount of overhead in the form of either hardware or software protocols. It is difficult to design a system to transfer data between a DSP and microcontroller due to "timing" constraints. For example, both the DSP and microcontroller are internally controlled by firmware or the like having embedded commands which govern when the DSP or microcontroller may send or receive data. These data "cycles" occur periodically or may be actuated when a specific signal, called a hardware "interrupt" is received by the DSP or microcontroller. Using interrupts is a partial solution, but it has its costs. The use of hardware interrupts devours precious processing time from both the DSP and microcontroller, time that could be spent doing other things. Another solution is to use a dual port random access memory ("RAMP") in between the DSP and microcontroller. However, contemporary dual port RAMs are expensive, dense static RAM ("SRAM") devices which have high "pin" counts. Pins are the physical connections which protrude from an electronic device, typically used to connect the device to other devices or signals. To access an SRAM/RAM both the DSP and microcontroller must be designed to include a substantial number of pins which are used to retrieve or send commands or data from/to an SRAM. In addition, certain data communication protocols must be used by the DSP and microcontroller in order for them to distinguish between information which is related to commands and that which is pure data and for making other decisions, such as how much data can be transferred in a given time period and where the data can be sent (i.e., what part of the DSP or microcontroller's memory is available to store data). All of which, again, ties up precious processing time and resources.

Accordingly, it is an object of the present invention to provide for devices which allow for the transfer of data between two or more electronic devices, such as a DSP and microcontroller, which frees both from the need to consider each others' timing constraints.

It is a further object of the present invention to provide for devices which allow for the transfer of data between two or more electronic devices, such as a DSP and microcontroller, and which does not require either device to have a substantial number of pins for retrieving or sending data.

It is still another object of the present invention to provide for devices which allow for the transfer of data between two or more electronic devices, such as a DSP and microcontroller, which reduces the amount of processing time needed to transfer data between devices.

Other objectives, features and advantages of the present invention will become apparent to those skilled in the art from the following description taken in conjunction with the accompanying drawings.

SUMMARY OF THE INVENTION

In accordance with the present invention, memory devices are provided for storing data generated by two or more electronic devices, such as a DSP or microcontroller. The novel memory devices comprise at least first and second memory sections. The first memory section is dedicated to the storage of data from the DSP only while the second memory section is dedicated to the storage of data from the microcontroller, and only the microcontroller. Data is stored on a first-in, first-out basis. Once stored, the data may only be retrieved from the particular memory section by the "opposite" device. That is, data stored in the first memory section by the DSP can only be retrieved by the microcontroller and data stored in the second memory section by the microcontroller can only be retrieved by the DSP.

Data is input and output via first and second data input/output sections, respectively. The first data input/output ("I/O") section allows data to be input into the first memory section and output from the second memory section; the second data input/output section allows data to be input into the second memory section and output from the first memory section. The first data input/output section may be viewed as being dedicated to the transfer of data to and from the DSP while the second data input/output section is dedicated to the transfer of data to and from the microcontroller.

The first and second data input/output sections form a "dual port access" to the first and second memory sections. Data can simultaneously be input or output from both memory sections via both I/O sections. The I/O sections may be serial or parallel sections for receiving/transmitting serial or parallel data.

The use of a dual port memory device substantially reduces the need for the DSP or microcontroller to keep track of each others' timing constraints/cycles. Either device can simply "dump" data into the memory device and go on about its' business. At some later time, the data can be retrieved by the opposite device during an appropriate time period. When serial data is used, the number of pins needed by the DSP or microcontroller to transmit or receive data is substantially reduced.

The inventive devices and methods also comprise first and second data indication sections. These sections provide the DSP and microcontroller with information about the type of data being transmitted to them from the memory device. These sections are also used to provide the DSP and microcontroller with an indication of how much memory capacity is still available in the first or second memory sections, capacity which can be used to store more data. Said another way, these sections provide the DSP and microcontroller with an indication of how much data can be "written to", i.e. input into, the memory sections. Likewise, the first and second indication sections provide the DSP and microcontroller with an indication of how much data is still to be "read from", i.e., output from, the memory sections. Finally, the indication sections provide information to the memory device itself. When data is transmitted from the DSP or microcontroller, these sections tell the memory device the type of data it is receiving, i.e., data, command data, acknowledgment data, device status data, etc . . . In one embodiment of the invention the first and second data indication sections may input and/or output a pair of data bits to provide the DSP, microcontroller or memory device with a proper indication.

No longer must the DSP and microcontroller spend a large amount of processing time 2 interpreting commands and data using a communications protocol in order to determine how much data can be read from, or written to, memory. This information is provided by the first and second indication sections through the use of a pair of data bits or the like.

The novel memory devices comprise other features which help save processing time as well. A plurality of "memory pointers" are used to manage the input and output of data. Each memory section is given at least two pointers; one which "points" to the next, available memory location where data can be stored (input) and one which points to the next memory location where data must be output. The DSP or microcontroller no longer have to worry about addressing a certain memory location before sending or receiving data. Once the first or second indication sections indicate there is room to send or receive data, the DSP or microcontroller can act.

The present invention and its advantages can be best understood with reference to the drawings, detailed description of the preferred embodiments and claims that follow.

DETAILED DESCRIPTION OF THE INVENTION

Figure 1:
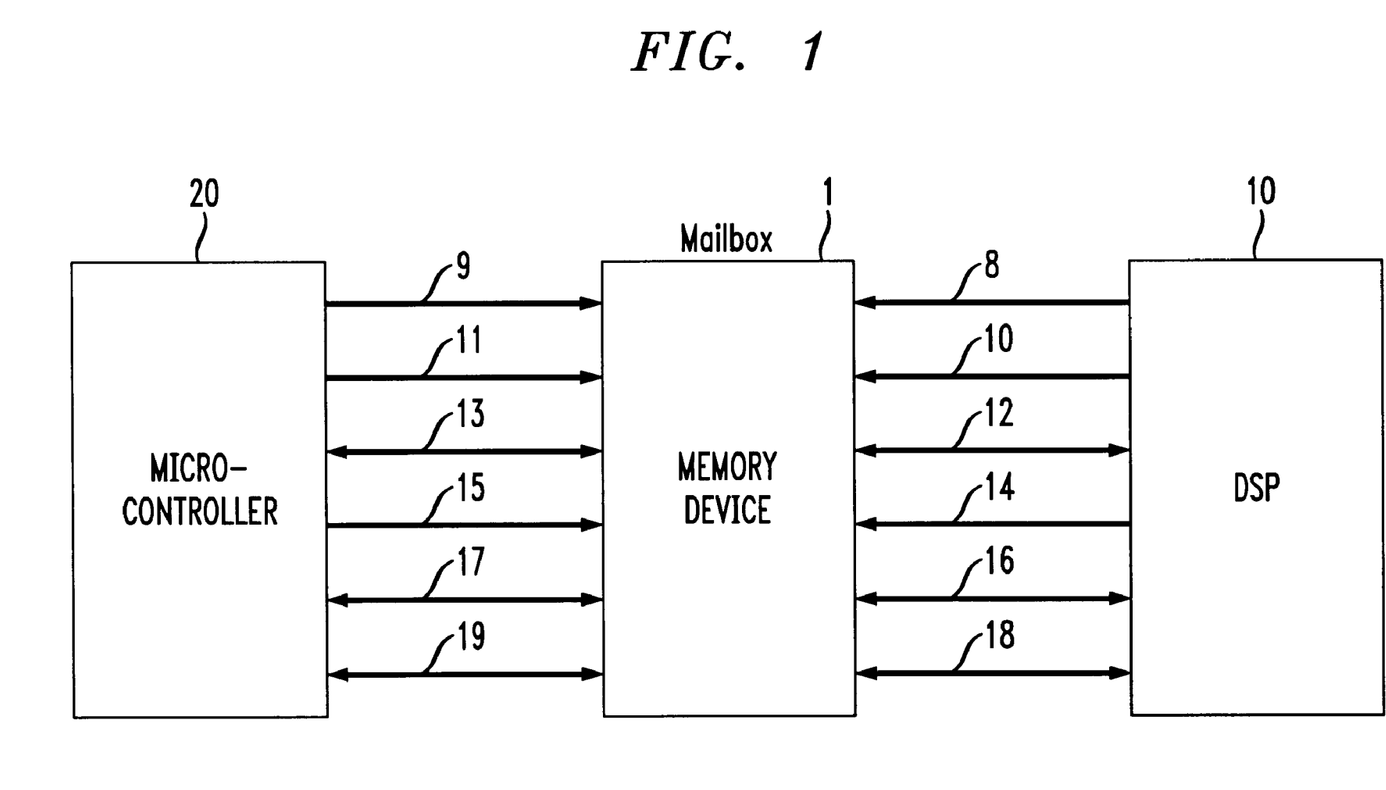
FIG. 1 depicts a standalone memory device connected to a DSP and microcontroller according to one embodiment of the present invention.

Referring to FIG. 1, there is shown a memory device 1 comprising memory locations or means adapted to store data connected to a DSP 10 and microcontroller 20 according to one embodiment of the invention.

From time to time the microcontroller 20 needs to send data to the DSP 10. Normally, the microcontroller 20 is constrained to send data to the DSP 10 during certain time periods no or cycles of the DSP's operation. However, instead of waiting for the DSP 10 to enter a data input cycle or the like the microcontroller 20 "dumps" the data to the memory device 1 via a second data IO pin 13 or means adapted to input (or output) data. The memory device 1 stores the data until such time as the DSP 10 is prepared to receive it. At an appropriate time, the DSP 10 retrieves data from the memory device 1 via a first data I/O pin 12 adapted to output (or input) data. In a similar manner, the DSP 10 can send data to the microcontroller 20 by making use of the memory device 1. Using the memory device 1 to store data frees both the DSP 10 and microcontroller 20 from the need to deal with timing constraints inherent in the transfer of data between the two.

In one embodiment of the invention, the first and second data I/O pins 12,13 comprise synchronous, serial data I/O pins. Serial data requires a single pin as opposed to parallel data which, typically, requires eight or more pins to transfer the same amount of data. Existing DSPs are capable of transferring serial data at a high rate of speed. This speed more than makes up for the reduction in pins from eight to one. As is apparent, the reduction in pins translates into a reduction in the number of pins which must be used to transfer data. DSPs and microcontrollers with reduced pin counts may be therefore be designed and utilized.

The memory device 1 may further comprise additional "indication pins" or first and second pairs of pins, 16,18 and 17,19 or means adapted to indicate a type of data being input into the memory device 1 by the DSP 10 or microcontroller 20, a type of data being output from the memory device 1 to the DSP 10 or microcontroller 20, an amount of data which can be input into the memory device 1 and an amount of data which can be output from memory a device 1. Both the first and second data I/O pins 12,13 and indication pins 16,18 and 17,19 can operate simultaneously.

Figure 2:
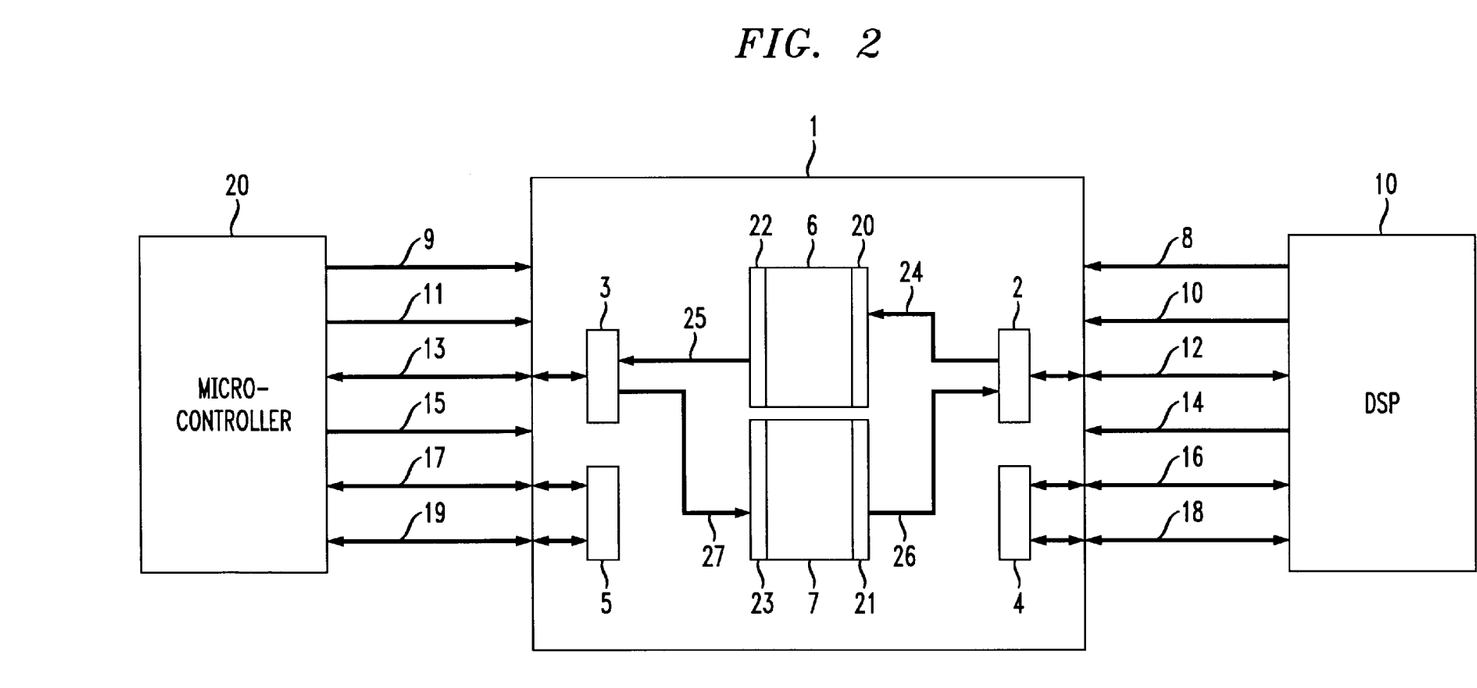
FIG. 2 depicts a standalone memory device connected to a DSP and microcontroller according to another embodiment of the invention.

FIG. 2 presents one embodiment of a more detailed look at the memory device 1 shown in FIG. 1.

The memory device 1 is shown comprising a first memory section or means 6, second memory section or means 7, first data I/O section or means 2, second data I/O section or 26 means 3, first data indication section or means 4, second data indication section or means 5 and memory pointers or means 20–23. It should be understood that the first and second memory sections may be further divided into a plurality of subsections (not shown in FIG. 2).

The first memory section 6 is dedicated and adapted to store data from the DSP 10 only, while the second memory section 7 is dedicated and adapted to store data from the microcontroller 20, and nothing else. On the other hand, data is only output to the DSP 10 from the second memory section 7 and only output to the microcontroller from the first memory section 6. Putting both ideas together, data is transferred from the DSP 10 to the microcontroller 20 via the first memory section 6 while data is transferred from the microcontroller 20 to the DSP 10 via the second memory section 7.

In between the DSP 10 and the first and second memory sections 6,7 lies the first data I/O section 2 and in between the microcontroller 20 and the first and second memory sections 6,7 lies the second data I/O section 3. In one embodiment of the invention, these sections comprise serial I/O data sections adapted to receive and transmit synchronous, serial data. In another embodiment, these sections may comprise parallel data I/O sections. It should be understood that the term "data" as used throughout this disclosure has two meanings. It is used to describe "pure" data which is data that is derived from external signals or internal calculations and also to describe a range of electronic signals used to command the DSP/microcontroller or provide status information about the DSP/microcontroller. Its exact meaning in a given statement must be derived from the context of the statement. As just used it means "pure" data.

Data sent from the DSP 10 is input into the first data I/O section 2 where it is directed to the first memory section 6 via internal bus 24 and stored. This data may then be output to 157 the microcontroller 20 through the second data I/O section 3 and bus 25. In the other direction, data sent from the microcontroller 20 is input into the second data I/O section 3 and sent to the second memory section 7 via bus 27 where it is stored. It may thereafter be output to the DSP 10 through bus 26 and the first data I/O section 2. It should be understood that the first and second data I/O sections 2,3 may operate simultaneously.

An example of how the memory device 1 operates using the first and second data indication sections 4,5 will now be described. At some point in time the DSP 10 polls the memory device 1 to determine whether the device 1 has room to store additional data, by sending a MODE signal (e.g., binary 1) on path 8 and a WRITE (e.g., binary 0) signal on path 14. In response, the first indication section 4 is adapted to place a pair of signals on paths 16,18. These signals will indicate whether the first memory section 6 has the capacity to store additional data. In another embodiment of the invention, these signals may indicate whether a specific subsection of the first memory section 6 has room to store additional data. To avoid confusion, when used in this manner the MODE signal will be referred to as a second mode signal.

Figure 4:
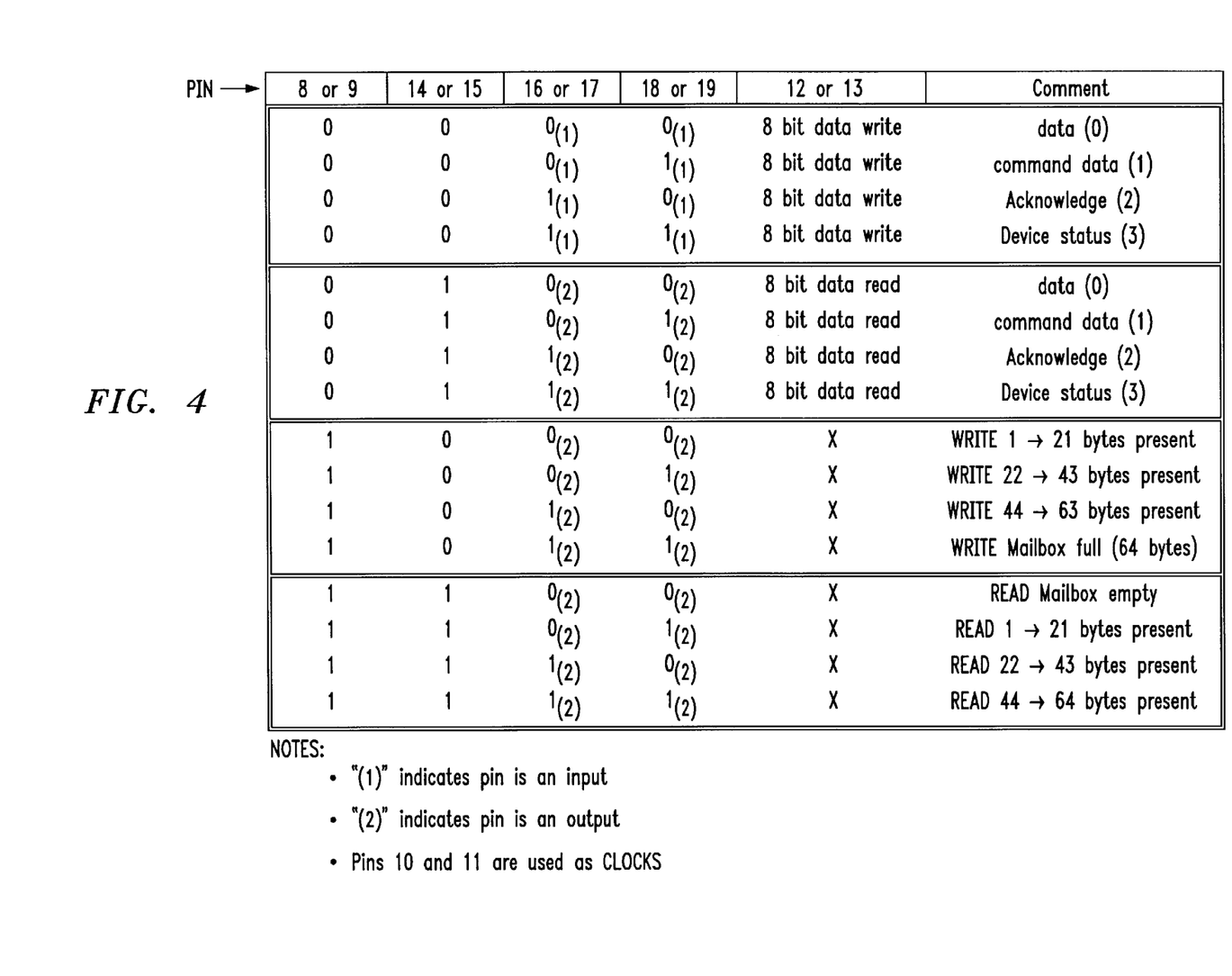
FIG. 4 depicts a truth table governing the input and output of data from a memory device according to one embodiment of the invention.

The first indication section 4 is adapted to indicate to the DSP 10 the amount of capacity still remaining, if any, using a wide variety of signals. In one embodiment of the invention the signals comprise a pair of binary data bits. FIG. 4 shows a truth table which lists the possible binary states, i.e., a "1" or "0" for the two data bits (see columns 3, 4 and rows 9–12). The DSP 10 polls the two data bits present on paths 16,18. Assuming they indicate the first memory section 6 has capacity, the DSP proceeds to output data via path 12 to the device 1. In addition, the DSP 10 outputs signals to the first indication section 4 which is adapted to receive the signals along paths 16,18 and also outputs a first mode signal (e.g., binary 0) on path 8 and a WRITE signal on path 14. Once received, these signals are decoded by the memory device 1. In one embodiment of the invention the signals input into the first indication section 4 comprise a pair of binary data bits which indicate the type of data being input from the DSP 10. For example, one combination of data bits, e.g., a binary 0 and binary 0, may indicate that pure data is being sent to the device 1. The truth table shown in FIG. 4 lists the possible states for the two data bits (see column 3, 4 and rows 1–4). In this manner, 35 the DSP 10 can inform the memory device 1 about the type of data it is sending without having to expend a lot of processing time generating and receiving a string of command messages based on a data communications protocol.

During the time the DSP 10 is transmitting data to the memory device 1, it is also periodically checking the signals present on paths 16,18. At some point the first indication section 4 is adapted to generate signals to the DSP 10 indicating that the first memory section 6 no longer has any capacity to accept additional data. This will halt the transmissions from the DSP 10.

In a similar manner, the microcontroller 20 transmits data to the second memory section 7 in conjunction with the second data indication section 5. It should be understood that the truth table shown in FIG. 4 may be used for either the microcontroller 20 or DSP 10.

After data has been stored in the memory device 1 it must be output to the DSP 10 or microcontroller 20. In one embodiment of the invention, the DSP 10 periodically polls the device 1 in order to determine if any new data is present in the second memory section 7 which must be output or "read" by the DSP 10. Such data has been previously input into the second memory section 7 by the microcontroller 20.

The DSP 10 polls the device 1 by generating a second mode signal (e.g., binary 1) and placing it on path 8 and generating a READ signal (e.g., binary 1) and placing it on path 14. These signals are received by the device 1 and decoded. The first indication section 4 is then adapted to generate signals indicating the amount of data yet to be read, if any, by the DSP 10 from the second memory section 7. In one embodiment of the invention, the first indication section 4 generates a pair of data bits on paths 16,18 indicating the amount of data yet to be read from a subsection of the second memory section 7 (see FIG. 4, columns 3, 4 and rows 13–16).

Assuming that some data still needs to be read by the DSP 10, the DSP 10 next instructs the device 1 to send data by outputting a first mode signal (binary 0) on path 8 and a READ signal (e.g., binary 1) on path 14. The memory device 1 then outputs data to the DSP 10 via the first data section 2 and path 12. The first indication section 4 is then adapted to output signals to the DSP 10 along paths 16,18 indicating the type of data being output from the second memory section 7. In one embodiment of the invention the first data indication section 4 outputs a pair of binary data bits indicating the type of data being output or read by the DSP 10 (see FIG. 4, rows 4–8). It should be understood that paths 12, 13 and 16–19 are bidirectional paths and that the first and second data I/O units 2, 3 and indication units 4, 5 are bi-directional as well.

Data can be read from the first memory section 6 by the microcontroller 20 in the same manner using the second data I/O section 3, second data indication section 5 and the truth table shown in FIG. 4.

Those in the art will recognize that the first and second data I/O sections 2,3 provide a dual port access into memory device 1.

When data arrives at the first and second memory sections 6,7 it must be directed to the next location within each section designated to receive data. Similarly, the device 1 must know the next location within each memory section where data must be retrieved in order to be output. The inventive memory device 1 comprises a plurality of memory pointers 20–23 for locating these next memory locations.

In one embodiment of the invention, a first memory pointer or means 20 is adapted to point to, or otherwise indicate, the next memory location within the first memory section 6 available to receive data from the DSP 10. A second memory pointer or means 22 is adapted to point to the next memory location within the first memory section 6 where data will be output when it is time to output data to the microcontroller 20. The second memory section 7 has a complimentary set of memory pointers which carry out similar functions. Third memory pointer or means 23 is adapted to point to the next location within the second memory section 7 available to receive data from the microcontroller 20 while fourth memory pointer or means 21 is adapted to point to the next memory location within the second memory section 7 where data must be output to the DSP 10. In one embodiment of the invention, the memory pointers 20–23 insure that data is input and output from the memory sections 6,7 on a first-in, first-out basis ("FIFO").

By providing memory pointers the device 1 frees up valuable processing time in the DSP 10 and microcontroller 20 which would otherwise have to be expended to keep track of the next available memory location to write to, or read from.

The exact memory capacity of the memory device 1 and memory sections 6,7 is not critical to an understanding of the present invention. To reduce costs, however, an overall memory capacity of 128 bytes (e.g., an array of 128, 8 bit bytes) is sufficient. In one embodiment the first and second memory sections 6, 7 comprise an array of 64, 8 data bit locations bytes. Likewise, the exact type of memory used is not crucial, though the memory device 1 and/or first and second memory sections 6, 7 may comprise RAM or SRAM memory devices.

Figure 3:
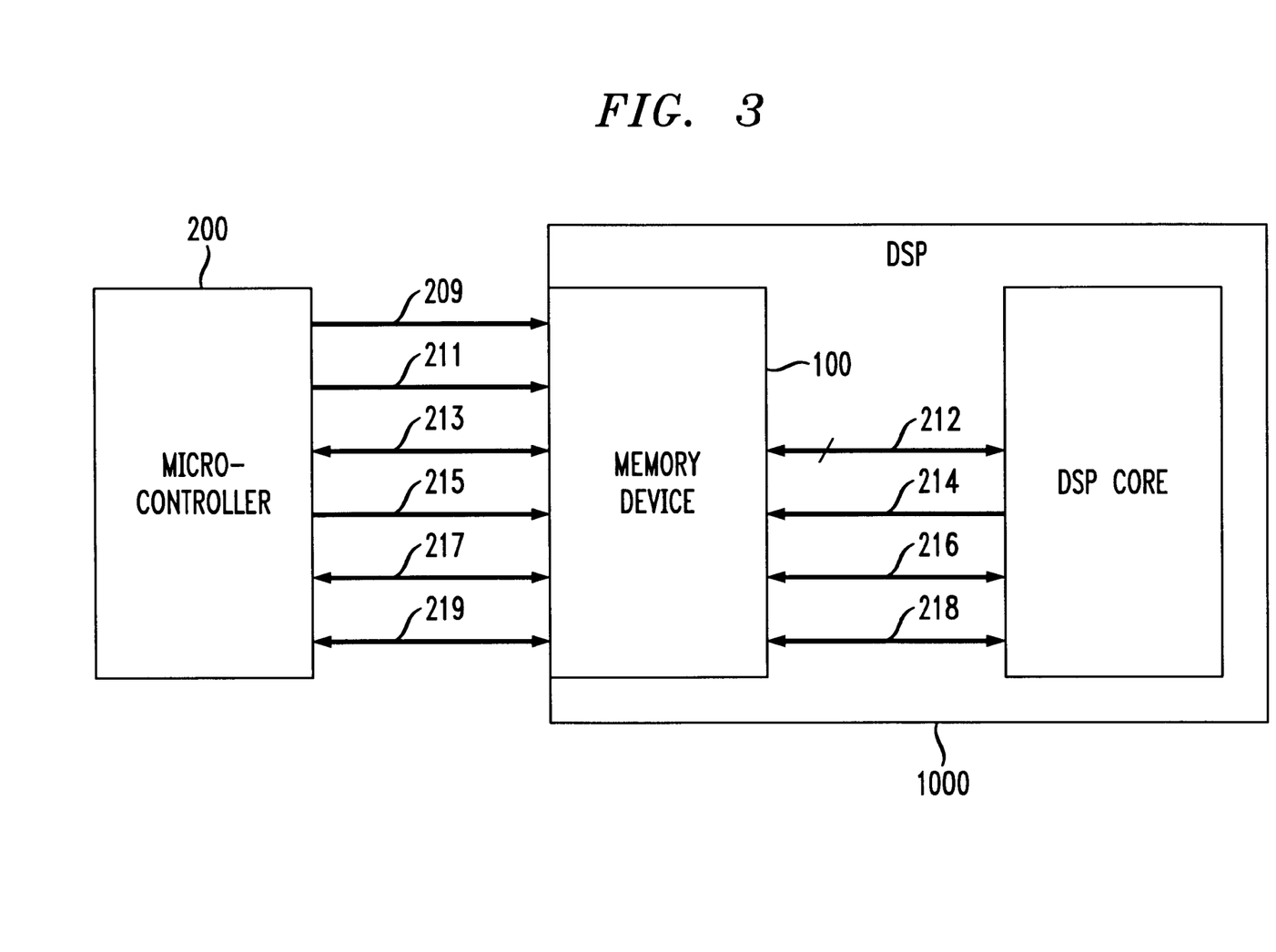
FIG. 3 depicts a memory device which is a part of a DSP or microcontroller according to one embodiment of the invention.

FIG. 3 depicts an embodiment of the invention where a memory device 100, which is substantially similar to memory device 1, is made part of a DSP or microcontroller 1000 (in is example a DSP). In one embodiment of the invention, either the first or second data I/O section within device 100 (depending on whether device 1000 is a DSP or microcontroller) comprises a parallel data I/O section adapted to input/output parallel data. It may not be necessary to use serial transmission because reducing the number of pins is not an issue once the device 1000 is placed onboard a DSP or microcontroller.

Though the above discussion has centered on memory devices for transferring data to and from a DSP and microcontroller, it should be understood that the novel memory devices of the present invention will work equally well when connected to other electronic devices. It should also be understood that the present invention may be realized using a number of methods which track the operation of the memory devices discussed above.

To those skilled in the art, the memory devices discussed above may be referred to as "intelligent" memory devices because they do more than just passively store data and the structure which combines a memory section along with the respective FIFO pointers may be viewed as forming a circular memory buffer.

We claim:

1. A memory device comprising:

memory locations adapted to store data;

first and second data input/output sections adapted to input data into the memory locations and to output data from the memory locations, wherein the first and second data input/output sections operate simultaneously; and first and second data indication sections adapted to indicate a type of data being input into the memory locations, a type of data being output from the memory locations, an amount of data which can be input into the memory locations and an amount of data which can be output from the memory locations, wherein the first and second data indication sections operate simultaneously.

2. The device as in claim 1 wherein the first and second data input/output sections comprise first and second data input/output pins.

3. The device as in claim 1 wherein the first and second data indication sections comprise a first pair of data indication pins and a second pair of data indication pins.

4. The device as in claim 1 wherein the memory locations comprise first and second memory sections adapted to store data.

5. The device as in claim 4 wherein the first data input/output section is further adapted to input data into the first memory section and to output data from the second memory section and the second data input/output section is further adapted to input data into the second memory section and to output data from the first memory section, wherein the first and second data input/output sections operate simultaneously.

6. The device as in claim 4 wherein the first data indication section is further adapted to indicate a type of data being input into the first memory section, a type of data being output from the second memory section, an amount of data which can be input into subsections of the first memory section and an amount of data which can be output from subsections of the second memory section and the second data indication section is further adapted to indicate a type of data being input into the second memory section, a type of data being output from the first memory section, an amount of data which can be input to subsections of the second memory section and an amount of data which can be output from subsections of the first memory section, wherein the first and second data indication sections operate simultaneously.

7. The device as in claim 4 further comprising a plurality of memory pointers, wherein a first memory pointer is adapted to point to a next memory location in the first memory section where data can next be input, a second memory pointer is adapted to point to a next memory location in the first memory section where data can next be output, a third memory pointer is adapted to point to a next memory location in the second memory section where data can next be input and a fourth memory pointer is adapted to point to a next memory location in the second memory section where data can next be output.

8. The device as in claim 7 wherein the plurality of pointers is further adapted to point to a next memory location on a first input-first output basis.

9. The device as in claim 4 wherein the first data input/output section is further adapted to input data into the first memory section upon reception of a first mode signal and a write signal by the device and to output data from the second memory section upon reception of a first mode signal and a read signal by the device.

10. The device as in claim 4 wherein the second data input/output section is further adapted to input data into the second memory section upon reception of a first mode signal and a write signal by the device and to output data from the first memory section upon reception of a first mode signal and a read signal by the device.

11. The device as in claim 4 wherein the first data indication section is adapted to indicate the type of data being input into the first memory section upon reception of a first mode signal and a write signal by the device, the type of data being output from the second memory section upon reception of a first mode signal and a read signal by the device, the amount of data which can be input into subsections of the first memory section upon reception of a second mode signal and a write signal by the device and the amount of data which can be output from subsections of the second memory section upon reception of a second mode signal and a read signal by the device.

12. The device as in claim 4 wherein the second data indication section is adapted to indicate the type of data being input into the second memory section upon reception of a first mode signal and a write signal by the device, the type of data being output from the first memory section upon reception of a first mode signal and a read signal by the device, the amount of data which can be input into subsections of the second memory section upon reception of a second mode signal and a write signal by the device and the amount of data which can be output from subsections of the first memory section upon reception of a second mode signal and a read signal by the device.

13. The device as in claim 4 wherein the first data input/output section is further adapted to input data into the first memory section from a digital signal processor and to output data from the second memory section to the digital signal processor.

14. The device as in claim 4 wherein the second data input/output section is further adapted to input data into the second memory section from a microcontroller and to output data from the first memory section to the microcontroller.

15. The device as in claim 11 wherein the first data indication section is further adapted to indicate the type of data being input into the first memory section from a digital signal processor, the type of data being output from the second memory section to the digital signal processor, the amount of data which can be input into subsections of the first memory section by the digital signal processor and the amount of data which can be output from subsections of the second memory section to the digital signal processor.

16. The device as in claim 4 wherein the second data indication section is further adapted to indicate the type of data being input into the second memory section from a microcontroller, the type of data being output from the first memory section to the microcontroller, the amount of data which can be input to subsections of the second memory section from the microcontroller and the amount of data which can be output from subsections of the first memory section to the microcontroller.

17. The device as in claim 4 wherein the first and second memory sections comprise random access memory.

18. The device as in claim 4 wherein the first and second memory sections comprise static, random access memory.

19. The device as in claim 4 wherein the first data indication section is further adapted to input a pair of data bits indicating the type of data being input into the first memory section, to output a pair of data bits indicating the type of data being output from the second memory section, to output a pair of data bits indicating the amount of data which can be input into subsections of the first memory section and to output a pair of data bits indicating the amount of data which can be output from subsections of the second memory section.

20. The device as in claim 4 wherein the second data indication section is further adapted to input a pair of data bits indicating the type of data being input into the second memory section, to output a pair of data bits indicating the type of data being output from the first memory section, to output a pair of data bits indicating the amount of data which can be input to subsections of the second memory section and to output a pair of data bits indicating the amount of data which can be output from subsections of the first memory section.

21. The device as in claim 4 wherein the first memory section comprises an array of 64, 8 data bit locations.

22. The device as in claim 4 wherein the second memory section comprises an array of 64, 8 data bit locations.

23. The device as in claim 8 wherein the first and second data input/output sections comprise a dual port access to the memory device.

24. The device as in claim 1 wherein the first data input/output section comprises a serial data input/output section.

25. The device as in claim 1 wherein the first data input/output section comprises a parallel data input/output section.

26. The device as in claim 1 wherein the second data input/output section comprises a serial data input/output section.

27. The device as in claim 1 wherein the second data input/output section comprises a parallel data input/output section.

28. The device as in claim 1 wherein the device comprises part of a microcontroller.

29. The device as in claim 1 wherein the device comprises part of a digital signal processor.

30. The device as in claim 1 wherein the memory locations comprise an array of 128, 8 data bit locations.

31. A memory device comprising:
memory means for storing data;
first and second data input/output means for inputting data into the memory means and for outputting data from the memory means, wherein the first and second data input/output means operate simultaneously; and
first and second data indication means for indicating a type of data being input into the memory means, a type of data being output from the memory means, an amount of data which can be input into the memory means and an amount of data which can be output from the memory means, wherein the first and second data indication means operate simultaneously.

32. The device as in claim 31 wherein the first and second data input/output means comprise first and second data input/output pins.

33. The device as in claim 31 wherein the first and second data indication means comprise a first pair of data indication pins and a second pair of data indication pins.

34. The device as in claim 31 wherein the memory means comprises first and second memory means for storing data.

35. The device as in claim 34 wherein the first data input/output means is further adapted to input data into the first memory means and to output data from the second memory means and the second data input/output means is further adapted to input data into the second memory means and to output data from the first memory means, wherein the first and second data input/output means operate simultaneously.

36. The device as in claim 34 wherein the first data indication means is further adapted to indicate a type of data being input into the first memory means, a type of data being output from the second memory means, an amount of data which can be input into subsections of the first memory means and an amount of data which can be output from subsections of the second memory means and the second data indication means is further adapted to indicate a type of data being input into the second memory means, a type of data being output from the first memory means, an amount of data which can be input to subsections of the second memory means and an amount of data which can be output from subsections of the first memory means, wherein the first and second data indication means operate simultaneously.

37. The device as in claim 34 further comprising memory pointer means, the memory pointer means further comprising first memory pointer means for pointing to a next memory location in the first memory means where data can next be input, second memory pointer means for pointing to a next memory location in the first memory means where data can next be output, third memory pointer means for pointing to a next memory location in the second memory means where data can next be input and fourth memory pointer means for pointing to a next memory location in the second memory means where data can next be output.

38. The device as in claim 37 wherein the memory pointer means is further adapted to point to a next memory location on a first input-first output basis.

39. The device as in claim 34 wherein the first data input/output means is further adapted to input data into the first memory means upon reception of a first mode signal and a write signal by the device and to output data from the second memory means upon reception of a first mode signal and a read signal by the device.

40. The device as in claim 34 wherein the second data input/output section is further adapted to input data into the second memory means upon reception of a first mode signal and a write signal by the device and to output data from the first memory means upon reception of a first mode signal and a read signal by the device.

41. The device as in claim 34 wherein the first data indication means is adapted to indicate the type of data being input into the first memory means upon reception of a first mode signal and a write signal by the device, the type of data being output from the second memory means upon reception of a first mode signal and a read signal by the device, the amount of data which can be input into subsections of the first memory means upon reception of a second mode signal and a write signal by the device and the amount of data which can be output from subsections of the second memory means upon reception of a second mode signal and a read signal by the device.

42. The device as in claim 34 wherein the second data indication means is adapted to indicate the type of data being input into the second memory means upon reception of a first mode signal and a write signal by the device, the type of data being output from the first memory means upon reception of a first mode signal and a read signal by the device, the amount of data which can be input into subsections of the second memory means upon reception of a second mode signal and a write signal by the device and the amount of data which can be output from subsections of the first memory means upon reception of a second mode signal and a read signal by the device.

43. The device as in claim 34 wherein the first data input/output section is further adapted to input data into the first memory means from a digital signal processor and to output data from the second memory means to the digital signal processor.

44. The device as in claim 34 wherein the second data input/output means is further adapted to input data into the second memory means from a microcontroller and to output data from the first memory means to the microcontroller.

45. The device as in claim 41 wherein the first data indication means is further adapted to indicate the type of data being input into the first memory means from a digital signal processor, the type of data being output from the second memory means to the digital signal processor, the amount of data which can be input into subsections of the first memory means by the digital signal processor and the amount of data which can be output from subsections of the second memory means to the digital processor.

46. The device as in claim 34 wherein the second data indication means is further adapted to indicate the type of data being input into the second memory means from a microcontroller, the type of data being output from the first memory means to the microcontroller, the amount of data which can be input to subsections of the second memory means from the microcontroller and the amount of data which can be output from subsections of the first memory means to the microcontroller.

47. The device as in claim 34 wherein the first and second memory means comprise random access memory.

48. The device as in claim 34 wherein the first and second memory means comprise static, random access memory.

49. The device as in claim 34 wherein the first data indication means is further adapted to input a pair of data bits indicating the type of data being input into the first memory means, to output a pair of data bits indicating the type of data being output from the second memory means, to output a pair of data bits indicating the amount of data which can be input into subsections of the first memory means and to output a pair of data bits indicating the amount of data which can be output from subsections of the second memory means.

50. The device as in claim 34 wherein the second data indication means is further adapts to input a pair of data bits indicating the type of data being input into the second memory means, to output a pair of data bits indicating the type of data being output from the first memory means, to output a pair of data bits indicating the amount of data which can be input to subsections of the second memory means and to output a pair of data bits indicating the amount of data which can be output from subsections of the first memory means.

51. The device as in claim 34 wherein the first memory means comprises an array of 64, 8 data bit locations.

52. The device as in claim 34 wherein the second memory means comprises an array of 64, 8 data bit locations.

53. The device as in claim 31 wherein the first and second data input/output means comprise a dual port access to the memory device.

54. The device as in claim 31 wherein the first data input/output means comprises a serial data input/output section.

55. The device as in claim 31 wherein the first data input/output means comprises a parallel data input/output section.

56. The device as in claim 31 wherein the second data input/output means comprises a serial data input/output section.

57. The device as in claim 31 wherein the second data input/output means comprises a parallel data input/output section.

58. The device as in claim 31 wherein the device comprises part of a microcontroller.

59. The device as in claim 31 wherein the device comprises part of a digital signal processor.

60. The device as in claim 31 wherein the memory means comprises an array of 128, 8 data bit locations.

* * * * *